United States Patent [19]

Ichikawa

[11] Patent Number: 5,617,560
[45] Date of Patent: Apr. 1, 1997

[54] SYSTEM FOR HANDLING PLATFORM INDEPENDENT OPTICAL CARD BY SEPARATING DURING A READ AND RECOMBINING DURING A WRITE GENERIC DIRECTORY INFORMATION AND OS DEPENDENT DIRECTORY INFORMATION

[75] Inventor: Kaori Ichikawa, Tokyo, Japan

[73] Assignee: Olympus Optical Co., Ltd., Japan

[21] Appl. No.: 295,007

[22] Filed: Aug. 24, 1994

[30] Foreign Application Priority Data

Aug. 27, 1993 [JP] Japan .................................. 5-212977

[51] Int. Cl.[6] ...................................................... G06F 13/00
[52] U.S. Cl. ......................... 395/500; 395/882; 395/884; 395/421.1
[58] Field of Search ...................................... 395/500, 800, 395/700, 375, 882, 884, 421.1; 364/200, 300, 900; 375/700

[56] References Cited

U.S. PATENT DOCUMENTS

| | | | |
|---|---|---|---|
| 4,649,479 | 3/1987 | Advani et al. ........................... | 364/300 |
| 4,855,905 | 8/1989 | Estrada et al. ........................... | 364/200 |
| 4,868,738 | 9/1989 | Kish et al. ............................... | 364/200 |
| 4,875,186 | 10/1989 | Blume, Jr. ................................ | 364/900 |
| 5,067,104 | 11/1991 | Krishnakumar et al. ................ | 395/375 |
| 5,083,262 | 1/1992 | Haff, Jr. ................................... | 395/500 |
| 5,097,533 | 3/1992 | Burger et al. ............................ | 395/500 |
| 5,136,709 | 8/1992 | Shirakabe et al. ...................... | 395/700 |
| 5,161,222 | 11/1992 | Montejo et al. ......................... | 395/500 |
| 5,239,662 | 8/1993 | Danielson et al. ...................... | 395/800 |
| 5,265,252 | 11/1993 | Rawson, III et al. ................... | 395/700 |
| 5,291,585 | 3/1994 | Sato et al. ................................ | 395/500 |
| 5,307,491 | 4/1994 | Feriozi et al. ........................... | 395/700 |
| 5,355,489 | 10/1994 | Bealkowski et al. ................... | 395/700 |
| 5,404,494 | 4/1995 | Garney ..................................... | 395/500 |
| 5,410,676 | 4/1995 | Huang et al. ............................ | 395/500 |
| 5,412,798 | 5/1995 | Garney ..................................... | 395/500 |
| 5,428,792 | 6/1995 | Conner et al. ........................... | 375/700 |
| 5,446,898 | 8/1995 | Bealkowski et al. ................... | 395/700 |

*Primary Examiner*—Thomas C. Lee
*Assistant Examiner*—Duo Chen
*Attorney, Agent, or Firm*—Laff, Whitesel, Conte & Saret, Ltd.

[57] ABSTRACT

The present invention is characterized in that in a system for accessing an optical card under the control of a general-purpose operating system (OS), the directory format of the optical card is such that directory data items for various types of general-purpose OS are divided into information usable in common in a plurality of different operating systems and control information peculiar to specific operating systems, and then the information usable in common is set in a common directory area, and the control information is set in individual information areas, thereby forming data items in a general-purpose format, and that when the CPU accesses the optical card, the control information suited for the operating system running on the CPU and the data in the common directory area are extracted from the data in the directory in the general-purpose format, and then these data items are recombined into a data format suited for the directory format of the operating system, and when the optical card is written into, information usable in common in a plurality of different operating systems and control information peculiar to specific operating systems are separated from the directory data given by the operating system running on the CPU, and these data items are recombined into the directory data in the general-purpose format where the information usable in common is set in the common directory area and the control information is set in the individual information areas, and the recombined data is handed over to the optical card.

20 Claims, 9 Drawing Sheets

| FILE NAME | ATTRIBUTE | DOS RESERVATION INFO | EDITING DATE | RECORDING LOCATION | FILE LENGTH |

MS-DOS DIRECTORY FORMAT

FIG. 5A

| PARENT DIRECTORY ID | FILE NAME | ATTRIBUTE | FILE TYPE CREATOR | FILE CREATOR | FILE LENGTH | RESOURCE LENGTH | CREATION DATE & TIME | ... | EDITING DATE & TIME | BACKUP DATE & TIME | FILE CHAIN INFO | RESOURCE CHAIN INFO |

MACINTOSH DIRECTORY FORMAT

FIG. 5B

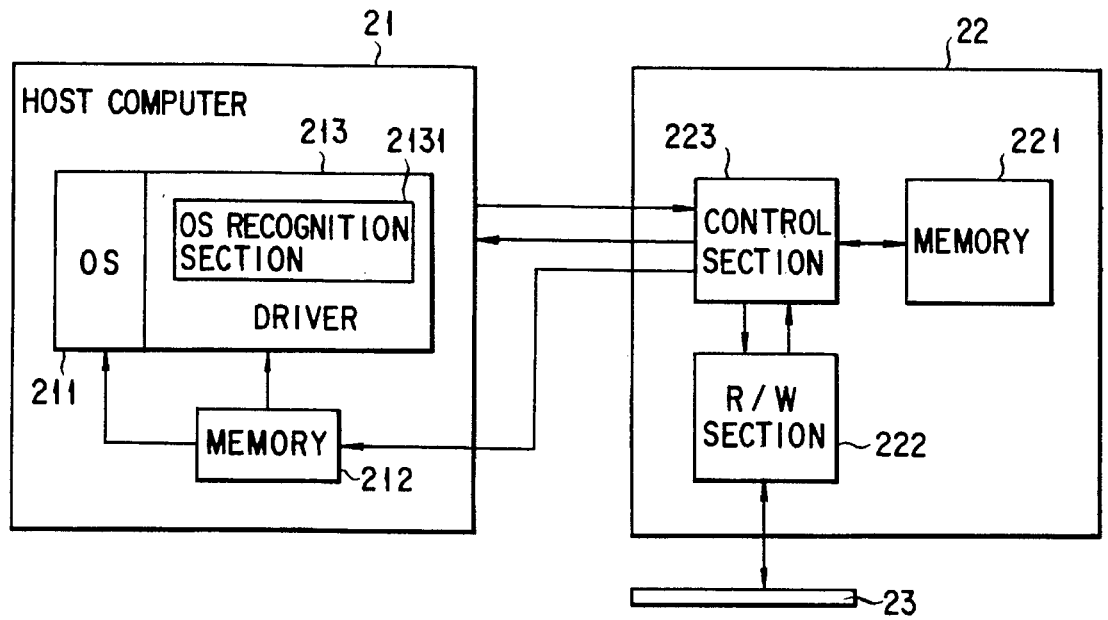
FIG. 6
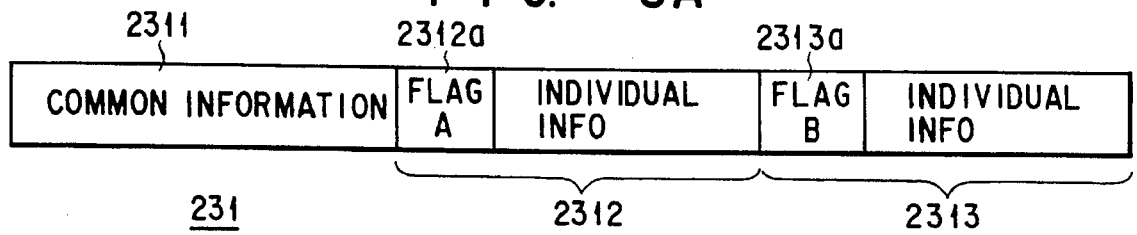
FIG. 8A
FIG. 8B

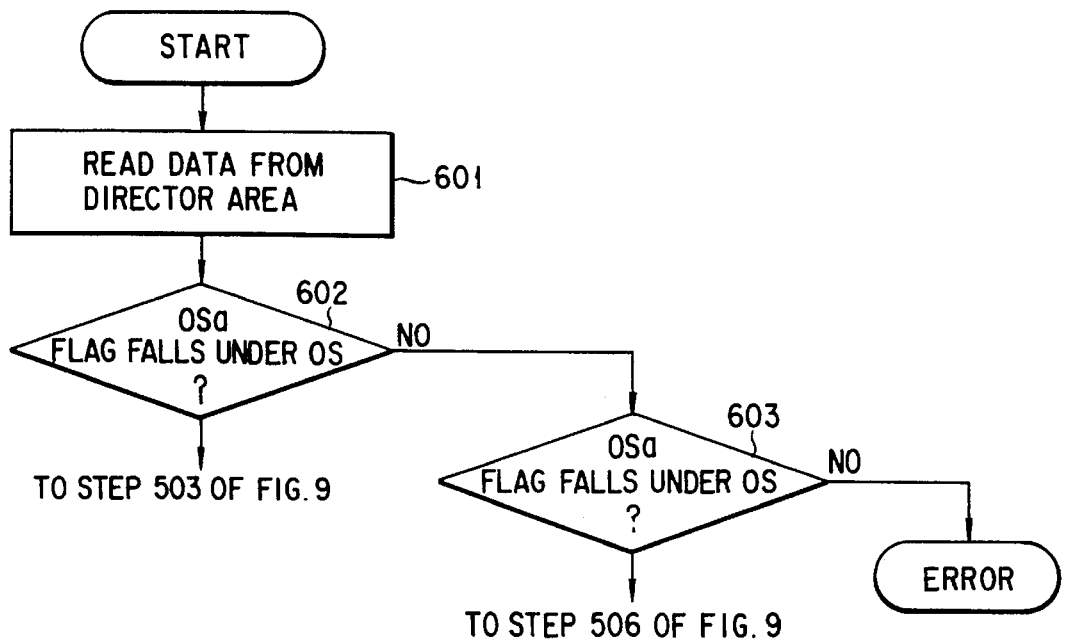
FIG. 10
| FLAG | OS TYPE | DATA LENGTH |
|---|---|---|
| 1 | MS-DOS | 10 |
| 2 | MACINTOSH | 26 |
| 3 | UNIX | 14 |
| 4 | WINDOWS NT | 40 |
FIG. 11A
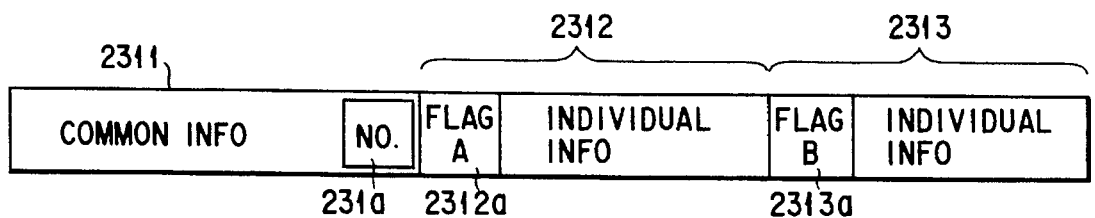
FIG. 11B

SYSTEM FOR HANDLING PLATFORM INDEPENDENT OPTICAL CARD BY SEPARATING DURING A READ AND RECOMBINING DURING A WRITE GENERIC DIRECTORY INFORMATION AND OS DEPENDENT DIRECTORY INFORMATION

BACKGROUND OF THE INVENTION

1. Field of the Invention

This invention relates to an optical card handling system used with a general-purpose operating system and a method of accessing an optical card.

2. Description of the Related Art

Information processing techniques have recently been making remarkable progress, and means for recording an increasingly large volume of information have been required. In this connection, what is now attracting attention is an optical information recording/reproducing apparatus.

This type of apparatus uses a recording medium which information can be optically written into and read from. As one of optical information recording/reproducing apparatuses of this type, an optical card apparatus using an optical card as a recording medium has been put to practical use. The optical card apparatus is capable of recording information on an optical card and reproducing the recorded information.

The optical card contains an information recording layer which has the property of changing irreversibly in the presence of heat. By projecting the laser light gathered by a lens onto the information recording layer, pits (holes) can be made in the layer. In this way, the presence and absence of pits (holes) made in the information recording layer represent a data string. Thus, by controlling the formation of pits according to the contents of data to be recorded, the desired data can be written. The reproduction of data is effected by optically sensing the presence and absence of pits in the information recording layer and converting into data.

The optical card has a recording capacity thousands to tens of thousands of times that of a conventional magnetic card. Once data is recorded in an area, the data cannot be rewritten. However, the data capacity that can be recorded on a single optical card is as large as 2 Mbyte to 4 Mbyte. Therefore, the optical card is considered to applied to a variety of uses including bankbooks, pocket maps, and prepaid cards used in shopping. Furthermore, by making use of the advantage that data cannot be rewritten, the optical card is considered to be applied to the case where data must not be falsified.

An example of the optical card is shown in FIG. 12. The optical card 1 shown in the figure is of the credit card size and has a data recording section 2 on its one side. The data recording section 2 is divided into a lot of tracks 2a as the magnetic recording medium is. Each track 2a is straight. Data is recorded sequentially track by track in the direction in which the track extends. The specific areas at both ends of each track 2a, that is, the specific regions at the begin and terminate ends of each track 2a, are used as ID sections 3a, 3b in which information items such as track addresses are recorded.

As described above, the optical card 1 is a medium on which data is recorded in the form of the presence and absence of pits, more specifically, on which data is recorded by forming pits in each track. Once pits are formed, they cannot be filled in, so that new data cannot be written over the track in which data is already written. This type of optical card is called a write-once, read-many type.

However, data can be written in an unused track. Because each track has the ID sections 3a, 3b, a file can be updated as follows. When the data is updated, the whole file including the data items to be updated is recorded on an unused track, and the old data file is discarded. As with the magnetic disk, some tracks are used for file management. Once the file is updated, new file management information is written on unused ones among the file management tracks, and management is effected so that the updated file can be distinguished from the discarded file.

To record and reproduce data onto and from the optical card 1, a read/write beam of laser light must be swept track by track. The light beam may be swept along the track. In addition, the same result may be produced by placing the light beam at a constant position and causing the optical card to move repeatedly along the track.

In general, the optical card is moved along the track and the light source of the optical beam is moved across the track so that data can be read from and written into the desired track.

A detailed structure of the data recording section 2 will be described. As shown in FIG. 13, a plurality of track guides 2a1 are provided at regular intervals in parallel with the track so that each track 2a2 may be formed between two adjacent track guides. Each track guide 2a1 can be sensed optically. A sensor for sensing the track guides is provided. Each track guide is sensed by the sensor. Because each track guide 2a1 and each track 2a2 are arranged along the same lane, the position of the light beam can be controlled so as not to depart from the track lane by sensing the track guide corresponding to the desired track with the sensor and controlling the position of the data read/write light beam so that the beam may move along the track guide. Of course, the data read/write light beam is positioned in the center of the track lane.

In this way, data pits 2a3 representing the recording information can be formed and read along the track 2a2. The track 2a2 of the data recording section 2 (not shown) is further divided into sectors. Data is read and written in sectors.

The data recording section 2 which data is read from and written into has a data area 2b1, a directory storage area 2b2, a change area 2b3, and a change information area 2b4. Namely, some of the tracks in the data recording section 2 are allocated to the data area 2b1, directory storage area 2b2, change area 2b3, and change information area 2b4, which are used as dedicated areas.

The change area 2b3 is an area used for changing the data when a recording error has occurred due to a defective track on the optical card 1, or for logically rewriting the data. The change information area 2b4 is an area in which the fact that the data is written in the change area 2b3 for replacement is recorded.

The data area 2b1 is an area in which the contents of the data forming a file is recorded. The directory storage area 2b2 is an area in which file management information is stored. In the directory storage area 2b2, the necessary information for file management, including a file name, the locations in which the file is recorded, and the length of the file, is recorded. Therefore, by searching the directory storage area 2b2 for the data storage location, the contents of the data can be retrieved.

With the optical card, the reading and writing of information is effected by an optical head composed of an optical system as shown in FIG. 15.

In the optical head shown in FIG. 15, the laser light emitted from a light-emitting element 4 is shaped by a collimate lens into parallel light and then passes through an object lens 6. The object lens 6 focuses the light onto the optical card 1. The reflected light from the optical card 1 passes through a mirror 7, an image forming lens 8, and a beam splitter 9, and is supplied to a detector 10. The detector 10 senses the reflected light and converts it into an electric light.

The detector 10 produces an electric signal according to the presence and absence of pits in the track. Thus, moving the optical card 1 along the track lane enables the data pits 2a3 shown in FIG. 13 to be sensed by the detector 10 in the form of the strength and weakness of the electric signal. Furthermore, in the optical head, the light obtained from the beam splitter 9 is supplied to a focus sensor 11 to sense the deviation of focus. By actuating an object lens driving section 12 according to the sense result of the focus deviation, the position of the object lens 6 is adjusted and thereby the focus is adjusted. To reciprocate the optical card 1 in its longitudinal direction (along the track lane), an optical card driving section 13 is provided. Explanation of a tracking error signal sensing system will be omitted.

When the optical card 1 is used in a computer system, attention should be given to the following points. In the computer system, to use the optical card 1, an optical card recording/reproducing apparatus is connected via an interface. The optical card recording/reproducing apparatus is controlled in various ways under the control of the operating system (OS), the basic program for the computer system, and reads and writes data from and onto the optical card 1.

Many personal computer systems and workstations use UNIX (a trademark of AT&T), MS-DOS (a trademark of Microsoft Corporation), Windows (a trademark of Microsoft Corporation), Macintosh-OS (a trademark of Apple Computer, Inc.), and DOS/V (a trademark of IBM corporation) as an operating system (OS). Under the present conditions, these OSes occupy the position of standard OSes in the fields of personal computer systems and workstations.

With these standard OSes, to manage files for an external storage apparatus, various pieces of information on files are stored in the directory, and on the basis of the information in the directory, the reading and writing of files is effected. These standard OSes differ from each other in the format of directory information and are not interchangeable with one another. Therefore, in a computer system using these standard OSes, when the optical card is read and written, access cannot be effected unless the data format in which data is recorded in the directory storage area 2b2 on the optical card coincides with the data format of the directory on the OS side.

That is, once the format of the directory storage area 2b2 on the optical card 1 is determined, operating systems which can access the optical card 1 are limited.

Generally, the optical card 11 is often carried with the user and used in various places. Consequently, he may encounter the case where his card must be read from or written into with an optical card recording/reproducing apparatus of a computer system running on an OS different from the OS used in recording the data on the optical card.

SUMMARY OF THE INVENTION

An object of the present invention is to provide an optical card handling system which ensures the interchangeability of the directory between different types of OS, thereby allowing different types of computers to access a single optical card.

Another object of the present invention is to provide a method of accessing an optical card.

To achieve the foregoing objects, in a system for accessing an optical card under the control of a general-purpose operating system, the directory format of an optical card is such that directory data items for various types of general-purpose OS are divided into information usable in common in a plurality of different operating systems, and control information peculiar to specific operating systems, and that the information usable in common is set in a common directory area in an optical card directory and the control information is set in individual information areas in the optical card directory, thereby forming directory data items. Furthermore, when the optical card is accessed, data items are recombined into a data format suitable for the directory format of the operating system to be used on the basis of the control information suited to the type of the operating system to be used and the data in the common directory area. When the optical card is written into, information usable in common in a plurality of different operating systems and control information peculiar to specific operating systems are separated from the data items in the directory data items given by the operating system to be used, and the information usable in common is set in the common directory area and the control information is set in the individual information areas, thereby forming directory data items, and these data items are handed over to the optical card.

Furthermore, more than one individual information area is provided, and the pieces of control information peculiar to the specific operating systems are set in the specific individual information areas. With more than one individual information area, the pieces of control information peculiar to the specific operating systems may be set in arbitrary ones of the individual information areas, with each of the individual information areas being provided with a flag indicating what type of operating system the control information belongs to.

Additionally, the number of individual information areas is any number, and the number of operating systems that can access the optical card is set in a common directory area. The pieces of control information peculiar to the operating systems are set in arbitrary ones of the individual information areas, and a flag indicating what type of operating system the control information belongs to is set for each individual information area, thereby making the data length of the directory variable.

As a result, from the information in the common directory area, it can be known where the file is on the optical card and how long the file is, so that at least the file can be read. Because when the individual information, the control information necessary for the operating system to be used, is in the individual information area, it can also be used, full file access can be effected in the operating system to be used.

Since the variable length structure can be used, the limited directory storage area of the optical card can be used effectively without waste.

With the present invention, the pieces of directory information about a plurality of different operating systems are recorded in the directory area of an optical card, and the directory information about the operating system corresponding to the directory format of the operating system to which the optical card is to be connected is accessed, so that more than one different operating system can read and write data from and into a single file on the optical card. By recording the common directory information about the operating systems and the individual directory information peculiar to these operating systems separately in the directory storage area of the optical card, the capacity allocated to the directory storage area of the optical card can be minimized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5A shows a directory format in MS-DOS in detail, and FIG. 5B shows a directory format in Macintosh-OS in detail;

FIG. 6 is a block diagram to help explain a second embodiment of the present invention, where the first embodiment is realized in the form of a system composed of a host computer and an optical card drive unit connected to the host computer;

FIG. 8A shows an example of the relationship between the flags used in the third embodiment and types of OS, and FIG. 8B shows a structure of directory data used in the third embodiment;

FIG. 10 is a flowchart to help explain the operation of the third embodiment;

FIG. 11A shows an example of the flags used in a fourth embodiment of the present invention, the types of OS, and the data length of pieces of individual information, and FIG. 11B shows a directory data format of an optical card used in the fourth embodiment;

DETAILED DESCRIPTION OF THE PREFERRED EMBODIMENTS

Hereinafter, referring to the accompanying drawings, embodiments of the present invention will be explained.

(First Embodiment)

Figure 1:
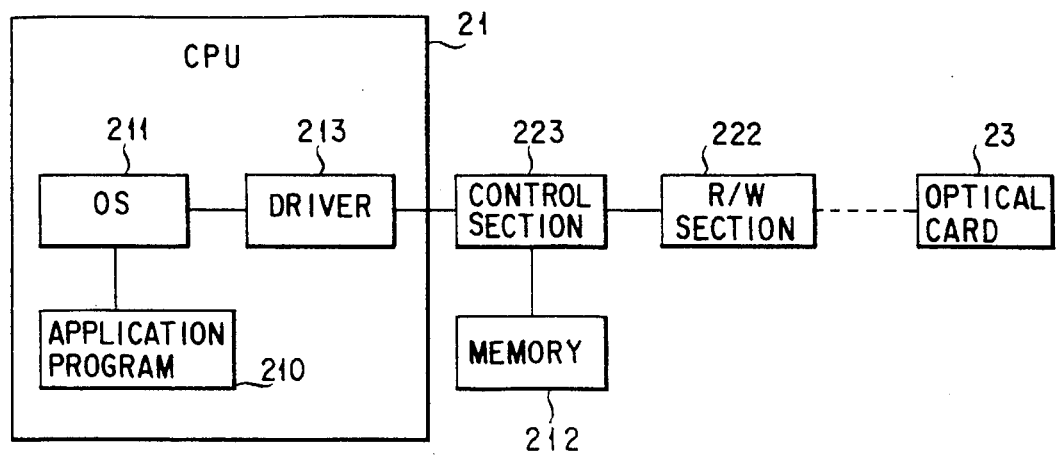
FIG. 1 is a schematic block diagram of a first embodiment of the present invention.

In a first embodiment of the present invention, a system capable of accessing an optical card under the control of two types of general-purpose operating system (OS) will be explained. FIG. 1 is a schematic diagram of a computer system that can access an optical card, according to the first embodiment. In the computer system in the figure, a processor 21 executes an application program 210 under the control of a general-purpose operating system (OS) 211 in order to process and display the data, display the process results, or input data. The processor 21 is provided with a driver 213 for accessing an optical card 23.

Therefore, the computer system is constructed so as to execute various applications and control of peripherals under the control of the general-purpose OS 211.

The OS 211 is MS-DOS, for example. A memory 212 temporarily stores all of the directory data items 231 on the optical card 23 explained later. The driver 213 is a device driver for supervising the accessing of an optical card as well as a functional element for interfacing between the OS and an optical card recording/reproducting apparatus. The driver 213 can be realized by software.

From all data items in the directory area of the optical card 23 stored in the memory 212, the driver 213 recognizes the directory corresponding to the directory format dealt with by the OS 211 of the host computer 21, recombines the contents of the recognized directory, and supplies the result to the operating system (OS) 211. It also has the function of breaking down the contents of the directory, recombining them into directory data items in a specific directory format for optical cards used in the invention, giving the recombined data items to the drive unit of the optical card to cause the recording/reproducting apparatus to write them as directory data onto the optical card.

In more detail, the driver 213 contains the following functions.

The first one is a combining function. The combining function is to extract the data from the areas where the necessary pieces of information for OS 211 are stored, by dividing the data read from the directory area 231 of the optical card in reading the optical card into a common information section and an individual information section, and then combining the directory information that can be processed by OS 211.

The second one is a directory information transfer function. The transfer function is to transfer the directory information combined by the combining function to OS 211.

The third one is the function of transferring the directory information to a control section 223. This function is to separate the directory information given by OS 211 into a common information section and an individual information section, shape these separated common information section and individual information section into a directory format explained later, and transfer the format as directory information to the control section 223.

These functions are part of the functions that the driver 213 has. The driver 213 has other various functions that interface between the OS and the drive unit of the optical card.

The computer system contains an R/W section 222 as a drive unit for reading and writing data from and into an optical card. The R/W section 222 records and reproduces data onto and from the optical card 23. The R/W section 222 has a similar optical head to that explained in the prior art and writes and reads data onto and from the track of the optical card.

The control section 223 exchanges data with the processor 21, temporarily stores data in the memory 212, and instructs the R/W section 223 to write and read data.

Figure 12:
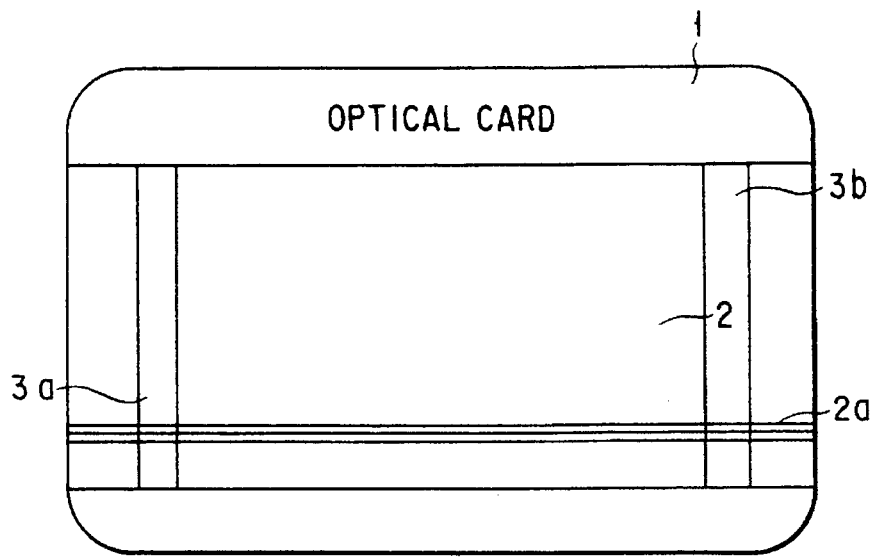
FIG. 12 is a view of an optical card.
Figure 13:
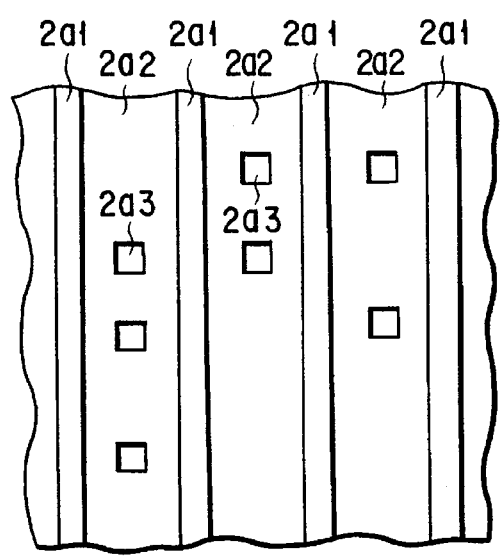
FIG. 13 is a view to help explain the data recording section of an optical card in detail.
Figure 14:
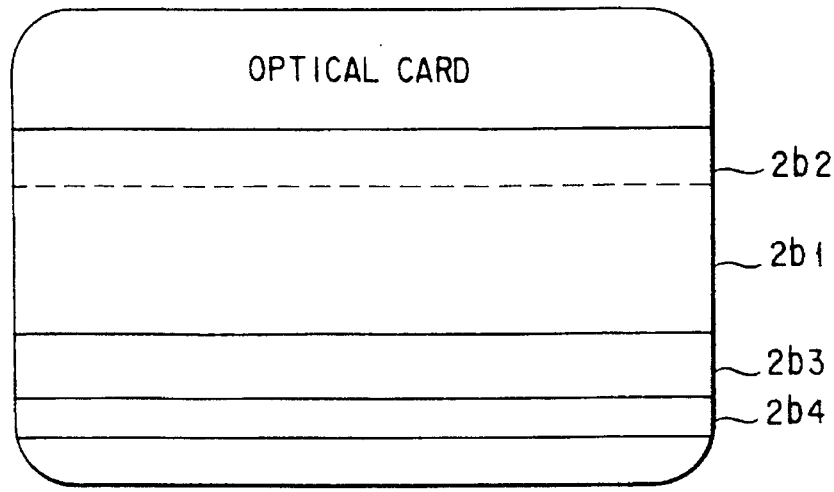
FIG. 14 is a view of the data recording section of an optical card.
Figure 15:
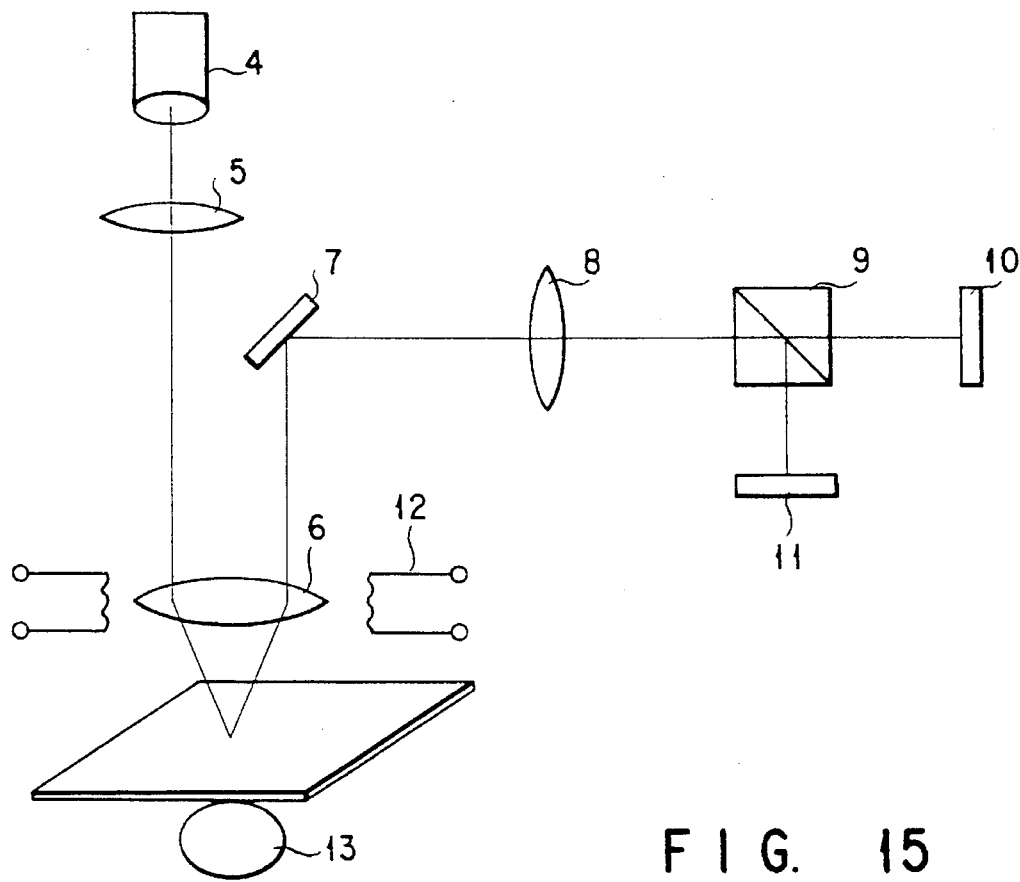
FIG. 15 is a schematic diagram of an apparatus for recording and reproducing the information into and from an optical card.

The optical card 23 has the same structure as that explained in FIGS. 12 to 14. In this embodiment, it is assumed that the optical card 23 can be accessed under the control of two types of OS among a variety of OSes. One of the two types of OS is MS-DOS and the other may be any OS, for example, Macintosh-OS.

Figure 2:
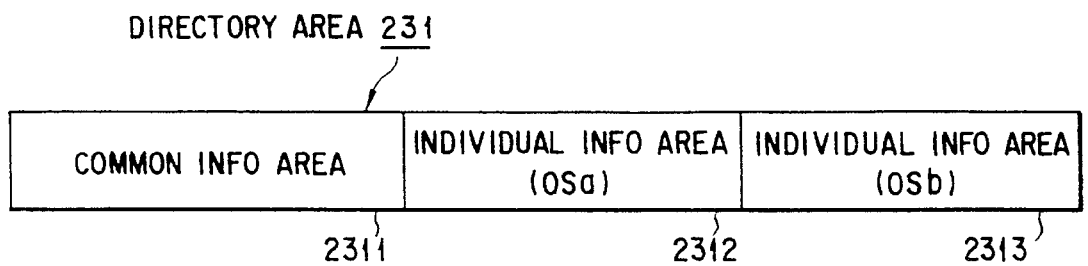
FIG. 2 shows a directory data format of an optical card in the first embodiment of the present invention.

Therefore, the optical card is assumed to be usable for MS-DOS, a first operating system (hereinafter, referred to as OSa) and Macintosh-OS, a second operating system (hereinafter, referred to as OSb). In the present invention for use with OSa and OSb, the directory area 231 of the optical card 23 is composed of a common information area 2311 and individual information areas 2312, 2313 (see FIG. 2). Specifically, the common information area 2311 has the same format for both OSa and OSb, and is an area in which pieces of directory information that can be shared, such as file names and file length, are to be stored. The individual information area 2312 is an area in which the directory information peculiar to the first operating system (OSa), such as control information, is to be recorded. The individual information area 2313 is an area in which the directory information peculiar to a second operating system (OSb), such as control information, is to be recorded. Therefore, the information common to both OSa and OSb is recorded in the common information area 2311 secured as much as a specified length. The directory information peculiar to each of OSa and OSb is recorded separately in the individual information areas 2312, 2313 secured as much as a specified length following the common information area 2311.

In the embodiment, OSa is used for an area in which MS-DOS individual information is recorded, and OSb is used for an area in which Macintosh-OS individual information is recorded.

Hereinafter, the operation of the embodiment thus constructed will be described.

It is assumed that the processor 21 of the computer system under the control of OS 211, MS-DOS, gives an read/write instruction of optical card 23 in the R/W section 223. Then, the processor 21 sends a command to the control section 223 via the driver 213. Receiving the command, the control section 223 causes the R/W section 222 to read the information from the directory area of the optical card 23. In this way, the R/W section 222 reads the information from the directory area of the optical card 23 and transfers the read-out information to the control section 223. The control section 223 causes the memory 212 to temporarily store the information in the directory.

Figure 3:
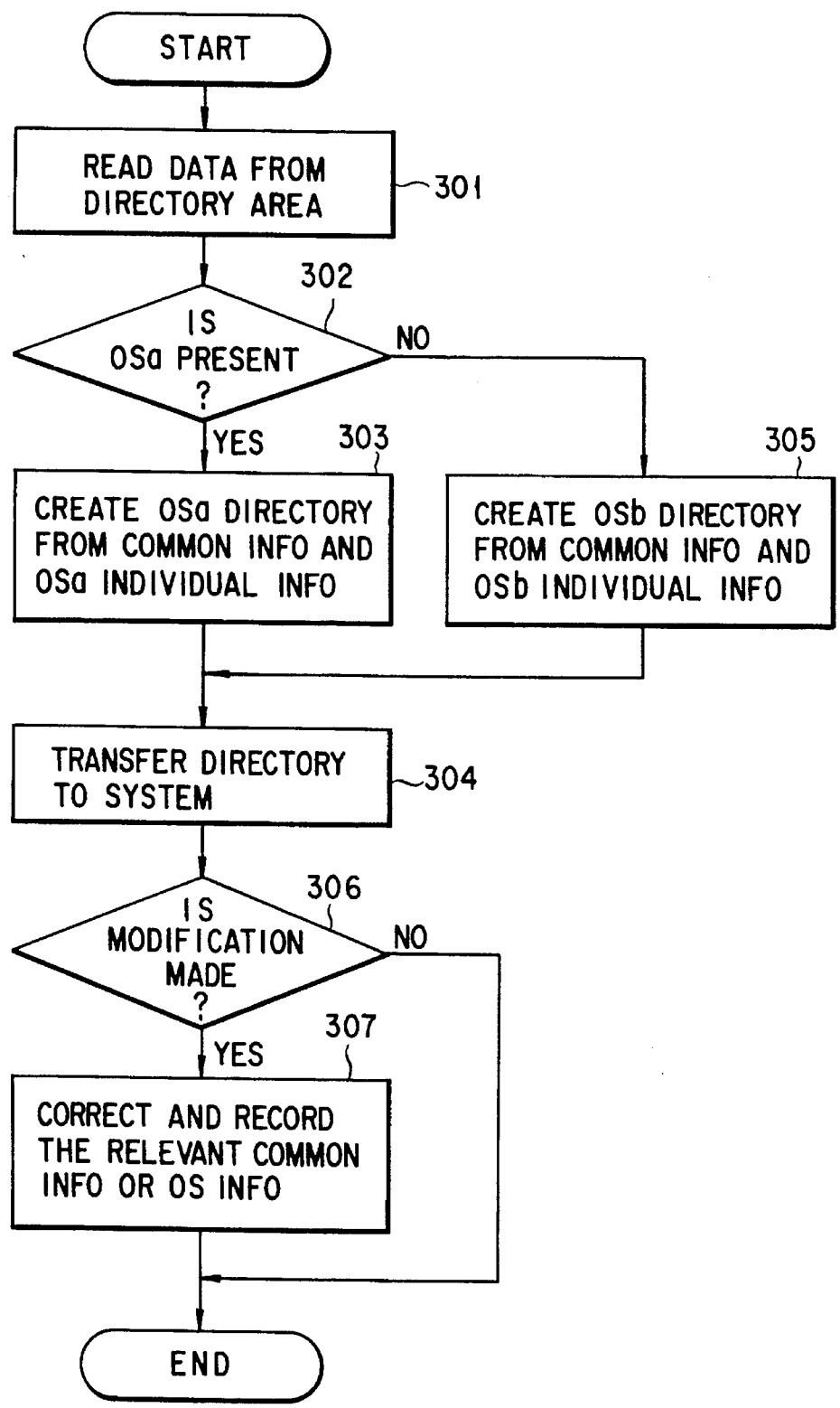
FIG. 3 is a flowchart to help explain an operation of the system of the first embodiment.

Next, the driver 213 in the processor 21 executes processes according to the flowchart shown in FIG. 3 in order to convert the data format to match the directory format of OS 211 with that of the optical card.

Explained next will be the case where an optical card is read whose individual information area 2312 holds OSa, individual information for OS 211, and whose individual information area 2313 holds no OSb. The driver 331 in the processor 21 reads the data items from the directory data shown in FIG. 2 temporarily stored in the memory 212 (step 301).

Next, the processor 21 performs the following processes using the function of the driver 213. First, from the whole contents of the data read out from the directory area, a check is made to see if there is OSa, the individual information for OS 211 (individual information for MS-DOS) in the individual information area 2312 (step 302).

In this case, because OSa is present, using the data in the common information area 2311 and data OSa in the individual information area 2312, the data items are recombined so as to be compatible with the directory format of OS 211 (step 303).

That is, the data read out from the directory area contains the data in the common information area 2311, data OSa in the MS-DOS individual information area 2312, and data OSb in the Macintosh-OS individual information area 2313. Because the OS 211 used by the processor 21 is MS-DOS, data OSa in the individual information area 2312 is used as MS-DOS individual information. Data OSa and the data in the common information area 2311 are recombined into data items in an MS-DOS directory format.

The MS-DOS format directory data obtained by the recombination is given to OS 211 (step 304).

Using the directory data, OS 211 supervises the reading and writing of files. When the data in the file read from the optical card 23 is changed by an application program executed via OS 211, the changed file must be written back to the optical card 23. Thus, the processor 21 executing the application program 210 sends a file data write command to the driver 213 via OS 211 after all the processes have been performed on the file read from the optical card 23.

Then, the processor 21 executes the function of the driver 213 and checks to see if any modification has been made on the files used by the application program (step 306). If a modification has been made, modifications have been made on the common information and OSa, the individual information, in the directory information, so as to recombine them into data items (directory data items) suited for the format of the directory data 231. Then, the processor 21 gives the recombined data and a file write command to the control section 223. Receiving the command, the control section 223 writes the directory data into the directory area of the optical card 23 via the R/W section 222, and the file data sent from the processor 21 in an unused area of the data area on the optical card 23. At this time, the write area of directory data is an unused area in the directory area.

The result of checking at step 306 shows that there is no modification, such writing is not effected and access to the optical card is terminated.

Hereinafter, the case where there is no data OSa in the individual information area 2312 will be explained.

For example, when the optical card 23 is suitable for the directory format of Macintosh-OS, there is no data OSa in the individual information area 2312, and instead, data OSb is present in the individual information area 2313 of the directory data 231.

In this case, since the processor 21 gives NO as a result of a check at step 302, the data items are recombined using the data in the common information area 2311 and data OSb in the individual information area 2313, so as to be suited for Macintosh-OS directory format (step 305).

The Macintosh-OS format directory data obtained by the recombination is given to OS 211 (step 304).

Using the directory data, the OS 211 supervises the reading and writing of files. OS 211 is MS-DOS and has a different format from the directory data of Macintosh-OS. However, the file name and the file length are pieces of common information that can be read by any OS. Thus, if the file name and the file length are given, at least a file can be read from the optical card 23 even if the control information is missing. Using the common information, OS 211 supervises the processor to access a file on the optical card 23.

When the data in the file read from the optical card 23 is changed by the application program executed by processor 21 under the control of OS 211, the directory area 231 of the optical card 23 must be corrected accordingly. The processor that executed the application program hands over a file data write process to the driver 213 via OS 211, after having finished all processes on the file read from the optical card 23.

Then, the processor 21 executes the function of driver 213 and checks to see if any modification has been made on the file used by the application program (step 306). As a result, because at least a modification has been made on the directory, the process for the case where a modification has been made will be performed. Then, the processor 21 causes the driver 213 to make the necessary modifications on OSa information, the common information and the individual information, to recombine the data items into data (directory data) suited for the data format of directory area 231. The directory information includes the common information, OSa information (the individual information), OSb information (Macintosh-OS individual information originally present).

The processor 21 gives the recombined data and a file write command to the control section 223. Receiving the command, the control section 223 causes the R/W section 222 to write the directory data into the directory area of the optical card 23, and the file data sent from the processor 21 into an unused area of the data area.

As a result of a check at step 306 made by executing the function of the driver 213, if the file data itself has not been modified, the processor 21 may modify the directory data by creating information for OSa and writing it in the individual information area 2312 so that OS 211 can supervise.

Consequently, even if the optical card 23 is of Macintosh-OS format, by dividing the directory area into a common information area and individual information areas for each type of OS, and recording the common information in the common information area and the individual information in the individual information area for each type of OS, the file can be read by a computer running under the control of different types of OS. Thereafter, by creating the directory information containing the individual information in the individual information area corresponding to the computer OS used in reading the file, and writing it onto the optical card, the file on the optical card can be handled as a file fully compatible with the directory format of the OS used on the computer currently running. Therefore, the file on a single optical card can be accessed even under the control of different types of OS.

Figure 4:
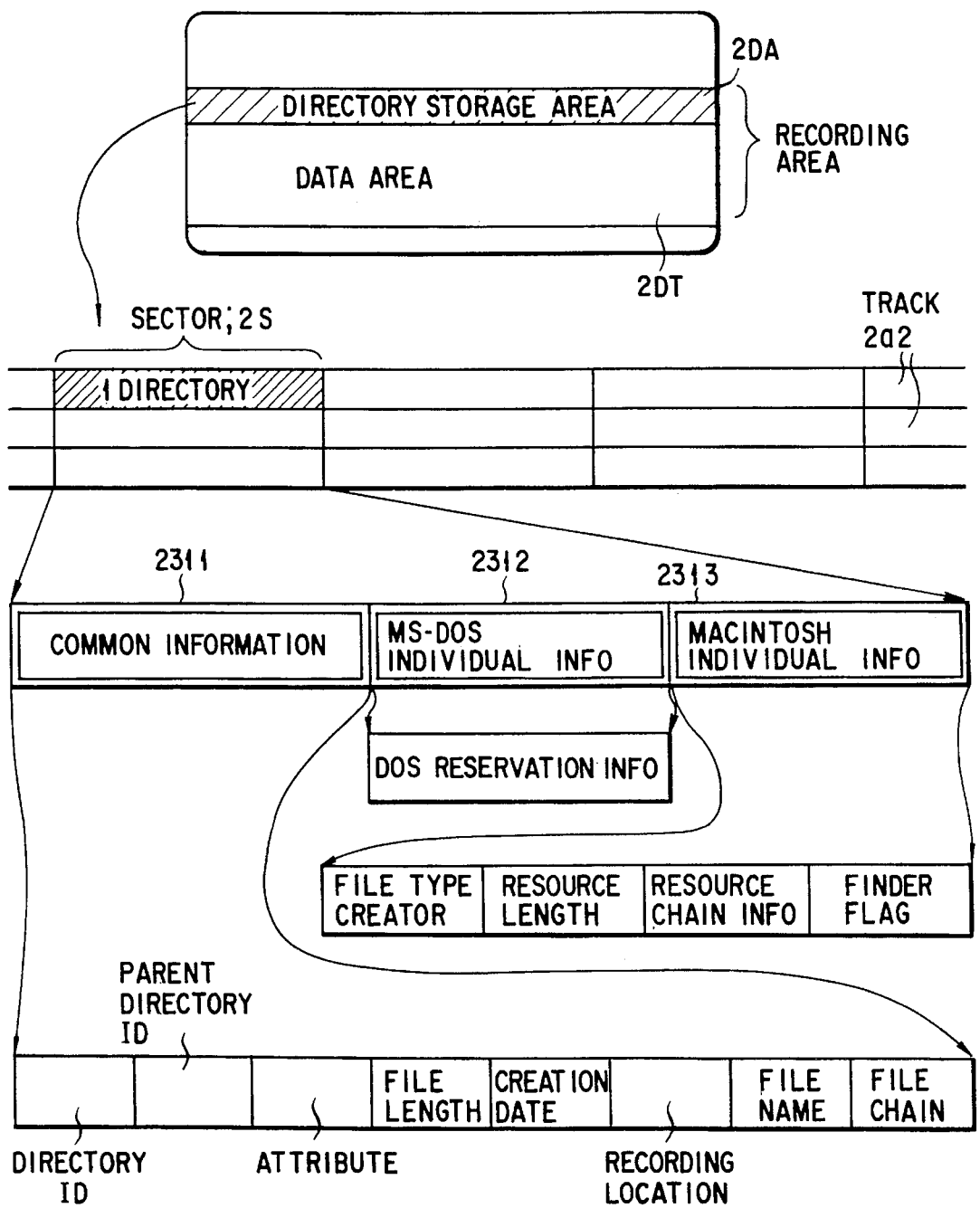
FIG. 4 shows a detailed example of the directory of the optical card dealt with by the system of the first embodiment.

A detailed example of the whole directory storage area of the optical card 23 is shown in FIG. 4.

For directory area 2DA, a specified number of tracks 2a2 are previously allocated to a specific location in the optical card 23. The tracks 2a2 are divided into a plurality of sectors 2S. A directory of data is stored in one sector, for example. A directory 2DA is provided in files. Each directory is divided into a common information area 2311, an MS-DOS individual information area 2312, and a Macintosh-OS individual information area 2313. Written in the common information area 2311 are the directory ID, the parent directory ID, attributes, the file length, the creation data, recording locations, the file name, file chain information, etc.

The directory ID indicates which directory the file belongs to. The parent directory ID indicates which parent directory the subdirectory belongs to. In MS-DOS, there are various types of files including SYS (system files), TEXT (text files), EXE (executable files), COM (executable files), BAT (batch files), and data files. Attributes indicate which type of file the file belongs to, whether the file is rewritable, etc. The file length represents the length of a file. Creation date stores a time stamp for the date and time of creation. Recording locations indicate in what location on the optical card a file is recorded. The file name is a name given to the file in which data is stored. File chain information indicates to which sector in which track the data is connected, when the data of a file is written in segments discontinuously. In the MS-DOS individual information area, DOS reservation information is written. In the Macintosh-OS individual information area, the unique information indispensable to control in a system running under the control of Macintosh-OS, including the file-type creator, the resource length, resource chain information, and Finder flags, is stored.

The items mentioned above are the contents of the directory recorded on the optical card. When writing is effected under the control of MS-DOS, the necessary information items are written into the common information area and MS-DOS individual information area in the directory. When writing is performed under the control of Macintosh-OS, the necessary information items are written into the common information area and Macintosh-OS individual information area in the directory.

The MS-DOS directory format is as follows. As shown in FIG. 5A, the MS-DOS directory format consists of a file name, an attribute, DOS reservation information, an editing date, a recording location, and file length.

The Macintosh-OS directory format is as follows. As shown in FIG. 5B, the Macintosh-OS directory format consists of a parent directory ID, a file name, an attribute, a file-type creator, a Finder location flag, file length, resource length, the date and time of creation, the date and time of editing, the date and time of backup, file chain information, resource chain information, and a Finder flag.

When a file is reproduced, the information of FIG. 4 is reproduced from the optical card, and from the reproduced information, the pieces of information shown in FIGS. 5A and 5B are created. On the other hand, when a file is recorded, the OS itself provides the pieces of information of FIGS. 5A and 5B to the contrary. From the pieces of information, the information of FIG. 4 is created and recorded onto the optical card.

When the file is written on the optical card, if the optical card 23 has been processed under the control of only MS-DOS, the Macintosh-OS individual information area cannot be obtained. Thus, only the directory data items in the MS-DOS directory format are recombined into the data items in the format of FIG. 4, and the recombined data is recorded onto the optical card.

Therefore, the Macintosh-OS individual information area of FIG. 4 remains blank.

Specifically, when an optical card in which an MS-DOS directory is written is read on a Macintosh-OS computer, the computer realizes that it should create a Macintosh-OS directory, converts the information of FIG. 4 into that of FIG. 5B, and hands over the information in the format of FIG. 5B as directory information. However, a sufficient amount of data to create the information of FIG. 5B is not prepared.

In this case, therefore, by setting "????????" in the file-type creator consisting of eight alphabetic characters, or "0" ("0" generally means a file) in the Finder location flag as a default value, a temporary directory is created and then handed over to the OS.

Therefore, even if the control information is missing, Macintosh-OS can read at least a file from the optical card 23 and use the data in the file as long as the pieces of common information, including the file name and the file length, are present.

Explained next will be a case where a file is recorded onto the optical card under the control of Macintosh-OS. Because the information of FIG. 5B is created under the control of Macintosh-OS, the driver separates the common information and the individual information from the information of FIG. 5B, and recombines these pieces of information into the information of FIG. 4. In this case, the MS-DOS individual information already recorded on the optical card is used directly in the recombination in the format of FIG. 4. The recombined information is handed over to the optical card and stored in the directory. Because the MS-DOS file is converted into a Macintosh-OS file, the remade directory is stored in a different sector within the directory storage area.

In this way, the directory information about each of the first operating system (OSa) and the second operating system (OSb) is recorded in the directory area 231 of the optical card 23. This makes it possible to access the directory information on the operating system corresponding to the directory format of the operating system (OS) 211 of the computer system to which the optical card 23 is connected. Therefore, it is possible for a computer system running under the control of a different type of OS to read and write data from and into a file on the optical card. In addition, because it is possible to selectively access the directory information about the first operating system (OSa) or the second operating system (OSb) suited for the directory format of OS 211 of the computer system, this eliminates the disadvantage in the prior art that the difference in directory format between the optical card and the OS makes accessing impossible.

In the directory area 231 on the optical card 23, the common directory information about the first operating system (OSa) and the second operating system (OSb) and the individual directory information peculiar to the first operating system (OSa) and the second operating system (OSb), are recorded separately. This minimizes the volume of the directory data 231 on the optical card 23, and consequently the data area can be made so much greater, assuring a large storage capacity for the optical card.

(Second Embodiment)

A second embodiment of the present invention is a system composed of a host computer and an optical card drive unit connected to the host computer, which provides the same function as that of the first embodiment.

Concerning the second embodiment, the case where accessing can be performed using two types of operating system (OS) will be explained as in the first embodiment.

FIG. 6 shows a schematic diagram of the second embodiment. The same parts as those in the first embodiment will be indicated by the same reference characters, and their explanation will be omitted. In the figure, a host computer 21A is used to display and enter data. The host computer 21A contains a general-purpose operating system (OS) 211, a memory 212, and a driver 213. It is designed to execute a variety of applications and control peripherals under the supervision of OS 211.

OS 211 is MS-DOS, for example. The memory 212 temporarily stores the whole contents of the directory data 231 on an optical card 23 explained later. The driver 213 is a device driver that supervises an optical card drive unit 22, and is a functional element for interfacing OS with the optical drive unit 22. The driver 213 is realized by software. Its function is realized by a host computer 21A executing the software.

The driver 213 has an OS recognition section 2131. The OS recognition section 2131 recognizes a directory corresponding to the directory format handled by OS 211 of the host computer 21A from the whole contents of the data in the directory area on the optical card 1 stored in the memory 212. It then recombines the contents of the recognized directory and gives the recombined contents to the operating system (OS) 211. Furthermore, it breaks down the contents of the directory, recombines them into directory data items in a specific directory format of the optical card, hands over the recombined data items to the optical card drive unit 22, and causes the unit to write them as directory data onto the optical card.

The OS recognition section 2131 is the same as the driver 213 in the first embodiment. Specifically, it has a combining function, the function of transferring directory information to OS 211, and the function of transferring directory information to the optical card drive unit 22.

The optical card drive unit 22 for reading and writing data from and onto the optical card is connected to the host computer 21A via an interface (not shown). The optical card drive unit 22 contains a memory 221, an R/W section 222, and a control section 223. A RAM for temporarily storing data to be read and written is used as the memory 221. The control section 223 is connected to the host computer 21A via an interface (not shown).

The optical card 23 has the same structure as that explained in FIGS. 12 to 14.

As described above, the second embodiment uses a directory where pieces of individual information are inserted in a specific area determined for each OS. This limits the types of OS that can access the optical card. To overcome this problem, it can be considered that the number of types of OS is increased to 3, 4, constituting the directory larger. To avoid this problem, a third embodiment of the present invention is provided. With the third embodiment, the length of the data items constituting the directory is minimized and the number of the types of OS that can access the card is increased. Hereinafter, the third embodiment will be explained.

(Third Embodiment)

A third embodiment of the present invention may be constructed as the first or the second embodiment is. Since the structure of the first and second embodiments have been explained in detail, their detailed explanation will not be given here.

Figure 7:
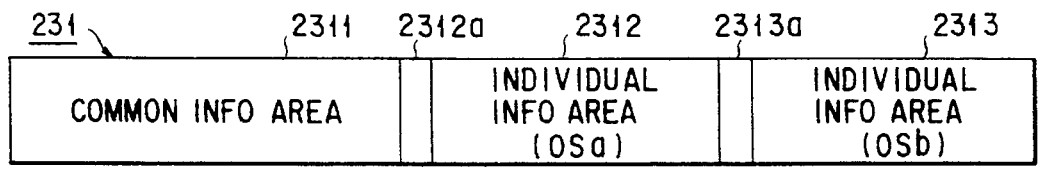
FIG. 7 shows a structure of directory data on the optical card used in a third embodiment of the present invention.

FIG. 7 shows the structure of directory data 231 in the third embodiment. As seen from the figure, in this embodiment, too, the directory data 231 consists of data in a common information area 2311, and that in two individual information areas 2312, 2313, as in the first and second embodiments. However, while in the first and second embodiments, the two individual information areas are each allocated to specific OSes, the two individual information areas 2312, 2313 in the third embodiment are for general purposes. Namely, the two individual information areas 2312, 2313 are not allocated to any particular OS.

Flag information areas 2312a, 2313a are secured at the beginning of the two individual information areas 2312, 2313. Flag information indicating the type of OS is written in the flag information areas 2312a, 2313a, from which it can be seen what type of OS the individual information is for. For example, as shown in FIG. 8A, in the flag information, "1" indicates MS-DOS, "2" Macintosh-OS, "3" UNIX, and "4" Windows NT.

The operation of the system according to the third embodiment will be explained. In this system, the basic operation flow is the same as that in the first and second embodiments. When the contents (FIG. 8B) of the directory area 231 on the optical card 23 is read, the driver 213 checks the OS flag at the beginning of the data. The OS flag is as explained earlier. In FIG. 8B, numerals 2311, 2312, 2313 indicate fixed-length data items. Thus, the device driver (driver 213) reads flag A (2312a) and flag B (2313a) in determined positions in the directory data 231, and determines the type of driver itself (this is written in the driver 213. For example, "1" is written for MS-DOS).

When one of the two flags is the flag of the OS coinciding with OS 211 of the computer system, and when there is no flag coinciding with OS 211 but either of the two flags is blank, accessing can be effected.

Specifically, when either flag A (2312a) or flag B (2313a) is "1," this means that the file has been created by MS-DOS. Thus, the directory has all complete data items, so that the driver 213 reads the directory area. On the other hand, when there is no flag coinciding with OS 211, and either of the two flags is blank, accessing can be effected because of the information in the common information area 2311 and the individual-information blank area in which individual information can be written in a write operation.

When both of the two flag are occupied, and none of them are "1," because there is no individual information blank area in which individual information can be written in a write operation, it is determined that the card cannot be dealt with by MS-DOS, and that an error has occurred.

Explained next will be an operation in the case where one of the two flags is blank and the other is a flag for OS different from OS 211 of the computer system.

When OS 211 is MS-DOS, and of the elements constituting the directory area 231, for example, flag A (2312a) is "2" indicating Macintosh-OS and flag B (2313a) is blank, the driver 213 checks the contents of the flag and knows the status of each flag, judges that accessing is possible, and recombines the data items into the directory format for MS-DOS.

Specifically, the driver 213 uses the data in the common information area, and a default value as the DOS reservation information necessary for the MS-DOS directory format, and recombines the data items in the directory. The default value for DOS reservation information is "0."

Then, the driver 213 hands over the directory data in this state to OS 211. Using the directory data, OS 211 accesses a file on the optical card 23 to provide the file data for an application. After the file on the optical card has been used, the directory data on the optical card 23 is rewritten so that the optical card 23 can be used as a MS-DOS file from this time on.

This is done as follows. Because "2" is set in flag A (2312a), Macintosh-OS control information is stored in the individual information area 2312, and only the individual information area 2313 is blank, the driver 213 sets MS-DOS code "1" in flag B (2313a) as information for the individual information area 2313, and also sets the DOS reservation information handed over by OS 211 as individual information. It then causes the directory data to be written in the format of FIG. 7 in the directory area on the optical card 23. When the contents of the file data are updated or changed, the file data itself is, of course, written back onto the optical card 23.

As a result, in a record operation, after MS-DOS code "1" is set in flag B (2313a), and the DOS reservation information handed over by OS 211 is set in the individual information area 2313, then recording is effected. Thereafter, the card can be accessed from not only Macintosh-OS, but also MS-DOS in its entirety. Since the individual information areas 2312, 2313 are fixed in length, MS-DOS, which has a little amount of control information peculiar to OS, produces unused areas, which are left blank.

The flow of processing will be described in more detail. It is assumed that the optical card 23 can be accessed by a first operating system OSa and a second operating system OSb. In this case, as shown in FIG. 7, in the directory data 231 on the optical card 23, the common directory information for OSa and OSb (e.g., the file name and the file length) is recorded in the common information area 2311, and the directory information peculiar to OSa and OSb (e.g., control information) is stored separately in the individual information areas 2312, 2313. Furthermore, these individual information areas 2312, 2313 are provided with flags 2312a, 2313a indicating the type of OS.

The contents of flag 2312a indicate that the directory information stored in the individual information area 2312 is for OSa. The contents of flag 2313a indicate that the directory information stored in the individual information area 2313 is for the second operating system (OSb).

Figure 9:
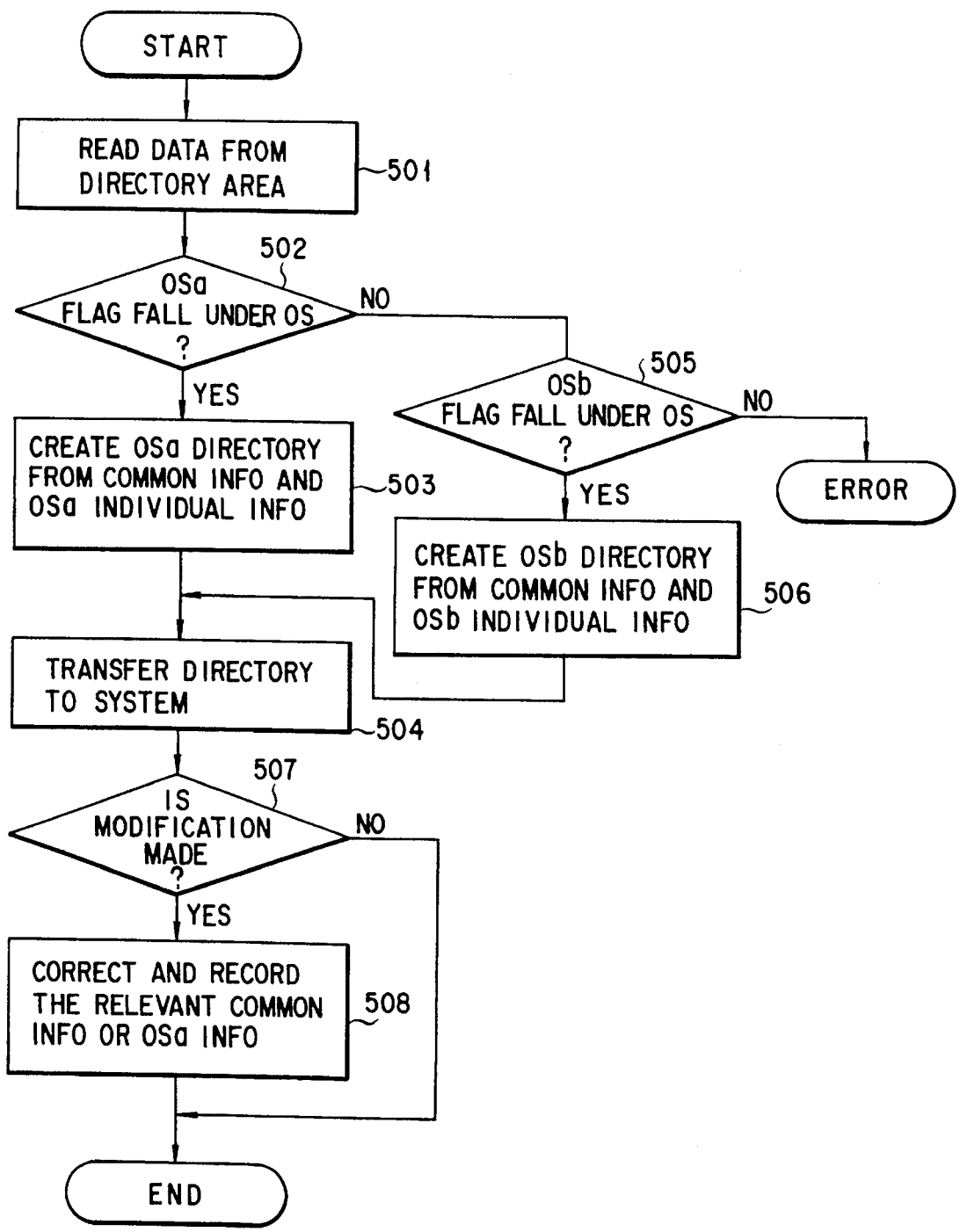
FIG. 9 is a flowchart to help explain the operation of the third embodiment.

In this case, when the reading and writing of the optical card 23 is commanded by the operating system (OS) 211 of the host computer 21, the driver 213 executes the processes according to the flowchart shown in FIG. 9.

First, the directory area 231 of FIG. 7 on the optical card 23 is read out (step 501). All of the contents of the directory area 231 are temporarily stored in the memory 212 of the host computer 21.

Then, the OS recognition section 2131 of the driver 213 recognizes the directory corresponding to the directory format of OS 211 of the host computer 21 from the whole contents of the directory area on the optical card 1 stored in the memory 212. In this case, flag 2312a is first taken out, and it is judged whether or not it coincides with the type of OS 211 of the host computer 21 (step 502).

If flag 2312a for the first operating system (OSa) comes under the type of OS 211 of the host computer 21, YES will be given. Then, control proceeds to step 503, where on the basis of the common directory information, including the file name and file length in the common information area 2311 in the directory data 231 and the control information peculiar to the first operating system (OSa) in the individual information area 2312, the directory information corresponding to the first operating system (OSa) is created (step 503). This directory information is handed over to OS 211 (step 504).

On the other hand, at step 502, if flag 2312a for the first operating system (OSa) does not fall under the type of OS 211 of the host computer 21, NO will be given. Then, control goes to step 505, where flag 2313a is taken out, and it is judged whether or not it comes under the type of OS 211 of the host computer 21 (step 505).

If flag 2313a for the second operating system (OSb) falls under the type, YES will be given. In this case, control proceeds to step 506, where on the basis of the common directory information, including the file name and file length in the common information area 2311 in the directory area 231 and the control information peculiar to the second operating system (OSb) in the individual information area 2313, the directory information corresponding to the second operating system is created (step 506). This directory information is handed over to OS 211 (step 504).

On the basis of the directory information handed over, OS 211 can access the data on the optical card 23.

At step 505, if NO is given, it is determined that there is no directory information corresponding to the type of OS 211 of the host computer 21 within the directory 231 on the optical card 23, and then an error process is performed.

If a modification is made on the directory information (step 507), the directory information in the common information area 2311 in the directory area 231 on the optical card 23, and that in the individual information area 2312 for the first operating system (OSa) and the individual information area 2313 for the second operating system (OSb) are modified and recorded (step 508). Then, the process is terminated.

Hereinafter, a case where OS 211 of the host computer 21 is a third operating system (OSc) different from OSa and OSb, will be explained. When OS 211, whose type is OSc, accesses the optical card 23 in which the directory information containing only information about the first operating system (OSa) and the second operating system (OSb) is recorded as directory data 231, the processing is effected according to the flowchart shown in FIG. 10.

First, the directory data 231 of FIG. 7 on the optical card 23 is read out (step 601). The whole contents of the directory area 231 are temporarily stored in the memory 212 of the host computer 21.

Then, the driver 213 takes flag 2312a out of the data in the memory 212, and judges whether or not the flag coincides with OS 211 of the host computer 21 (step 602). In this case, because flag 2312a for the first operating system (OSa) does not coincide with the type, NO will be given. Next, flag 2313a is taken out, and it is judged whether or not it coincides with the type of OS 211 of the host computer 21 (step 603). Then, because flag 2313a for the second operating system (OSb) does not coincide with the type, NO will be given. In this case, it is determined that there is no directory information about the third operating system (OSc) corresponding to the type of OS 211 of the host computer 21 within the directory 231 on the optical card 23, and then an error process is performed. At step 602, if the flag coincides with the type, control will, of course, proceed to step 503 or 506.

By providing the driver 213 with such a function, the first operating system (OSa) and the second operating system (OSb) corresponding to the directory format of OS 211 of the host computer 21 are judged on the basis of the result of checking flag 2312a and flag 2313a. This eliminates erroneous operations due to different types of OS, and assures a highly reliable operation of optical cards. Furthermore, it is possible to prevent any OS other than the first operating system (OSa) and the second operating system (OSb) from accessing the card.

In addition, the present invention may be applied to a system where the individual information areas are variable in length, not fixed, and thus the data in the directory can be dealt with in variable length. This eliminates waste in the data length, enabling effective use of the limited area on the optical card 23. Such a system will be explained hereinafter as a fourth embodiment of the present invention.

(Fourth Embodiment)

A system according to the fourth embodiment may have the same structure as that of the first or second embodiment. The data format of the directory data 231 in the fourth embodiment is as shown in FIG. 11B. As shown in the figure, the directory data 231 has a number area 231a in its common information area 2311, and sets the number of types of OS that the directory deals with in the number area 231a as number information.

By referring to the data in the number area 231a, it can be seen how many types of OS the directory handles. For example, if the directory deals with MS-DOS and Macintosh-OS, the data in the number area 231a is "2." If it handles only MS-DOS, the data in the number of area 231a is "1."

The directory data has individual information areas 2312, 2313, and areas for flag A (2312a) and flag B (2313a), as the third embodiment does.

If Macintosh-OS individual information is set in the individual information area 2312, and MS-DOS individual information is set in the individual information area 2313, "2" will be set in flag A (2312a) and "1" is set in flag B (2313a).

Because the data length necessary to individual information for each type of OS (see FIG. 11A) is determined, the data length for each type of OS can be known previously. The data length may be recorded together with the flags. By segmenting the data at the length of data from the flag position for each type of OS known from the flag, the individual information for the OS can be taken in. When the number of types of OS that the directory is currently dealing with is one, the data in the number area 231a is determined to be "1" and a single individual information area is provided. When the number of types of OS that the directory is currently dealing with is three, the data in the number area 231a is determined to be "3" and three individual information areas are provided. Similarly, the number of types of OS the directory is now handling is five, the data in the number area 231a is determined to be "5" and five individual information areas are provided. In this way, the number of types of OS that can access the optical card 23 can be increased as desired. Furthermore, the data length required to write the pieces of individual information corresponding to the types of OS that can access the card can be dealt with flexibly, so that the limited recording area on the optical card 23 can be used effectively.

A more detailed example will be explained. Flags are the same as those in the third embodiment. In FIG. 11A, the data length column shows the length of each piece of OS information. In FIG. 11B, the directory area 231 has only individual information areas 2312, 2313. The directory is variable in length and can have more pieces of individual information recorded in it within the permitted limit. How many pieces of individual information can be allowed is recorded in the column for the number area 231a indicating the number of pieces of OS information in the common information. Because the pieces of individual information 2312, 2313, ... are determined in length by the flags, these pieces of information can be read sequentially. Specifically, if the type of OS is known, the type of OS can be seen from the flag code because the individual information is fixed in length corresponding to each type of OS. This determines the length, thereby allowing the pieces of individual information to be read sequentially. When the recorded information does not contain the type of the driver itself, an additional piece of individual information with a flag is added. Then, the number of pieces of OS information in the common information is increased by one, and is recorded as a new directory.

In this way, the number of types of OS that can access the optical card 23 can be increased as desired. Furthermore, the data length required to write the pieces of individual information corresponding to the types of OS that can access the card can be dealt with flexibly, so that the limited recording area on the optical card 23 can be used effectively.

Various embodiments of the present invention have been explained. The invention is not limited to the above embodiments, but may be practiced or embodied in still other ways without departing from the spirit or essential character thereof. For instance, while in the above-described embodiments, the directory information about the first operating system (OSa) and the second operating system (OSb) is recorded in the directory area 231 on the optical card 23, pieces of individual information for a third and a fourth operating system may be further recorded in the directory area 231, thereby making it possible to deal with more types of OS.

With the present invention, the directory on the optical card is constructed so as to restore the directory information for different operating systems, and the device driver of the optical card is provided with the function of recombining the data items in the directory into the directory format required by OS, and handing over the recombined data items to OS. Thus, when the optical card is accessed, it is possible to hand over the directory data in the format suitable for OS used in the system that is going to access, so that the optical card can be accessed without any trouble. Additionally, the data in a file on the optical card can be accessed under the control of each of different OSes. In the prior art, because the directory format of the optical card differs from that of the operating system, data cannot be read or written. Even if the contents of the directory of the card were read by the operating system, the read-out data would not suit the directory format of the operating system, so that the data could not be read from or written into the desired recording location, and other erroneous operations would take place. With the invention, such problems can be solved.

Furthermore, in the directory storage area on the optical card, the common directory information (common information) about the operating system and the individual directory information (individual information) peculiar to the operating system are recorded separately. This minimizes the directory storage area on the optical card, and secures so much larger a data area, thereby virtually providing the optical card with a larger storage capacity.

What is claimed is:

1. In a system for accessing an optical card under the control of a general-purpose operating system, an optical card handling system comprising:

an optical card which data can be optically recorded on and reproduced from; read/write means for reading and writing data from and onto the optical card; and driver means which intervenes between said read/write means and said operating system and recombines directory data items; wherein said optical card has files recorded on it in a directory format where directory data items for various types of general-purpose operating system are divided into information usable in common in a plurality of different operating systems and control information peculiar to specific operating systems, and then said information usable in common is set in a common directory area in a directory, and said control information is set in individual information areas in the directory, thereby forming directory data items in a general-purpose format;

said read/write means has the function of reading said optical card and handing over the file directory information to said driver means, and in a write operation onto said optical card, updating the directory of said optical card with the data in the directory in said general-purpose format obtained from said driver means; and said driver means contains a first processing function of, when accessing the optical card under the control of said operating system, recombining the directory data in said common directory area and in said individual information area into a data format suited for the directory format of said operating system, and a second processing function of, in a write operation onto the optical card, separating information usable in common in a plurality of different operating systems and control information peculiar to specific operating systems from the directory data given by said operating system to be interfaced with, forming the directory data in said general-purpose format where the information usable in common is set in said common directory area and said control information is set in said individual information areas, and handing over the data to said read/write means.

2. An optical card handling system according to claim 1, wherein the number of said individual information areas provided is plural, and said pieces of control information peculiar to specific operating systems are set in a specific individual information area in each of said plurality of individual information areas.

3. An optical card handling system according to claim 1, wherein the number of said individual information areas provided is plural, and said pieces of control information peculiar to specific operating systems are set in arbitrary ones of said plurality of individual information areas, with each of said individual information area being provided with information indicating what type of operating system the control information in the individual information area belongs to.

4. An optical card handling system according to claim 1, wherein the number of said individual information areas is one or any number more than one, and the number of operating systems that can access the optical card is set in said common directory area, and when the number of said individual information areas is plural, said pieces of control information peculiar to specific operating systems are set in arbitrary ones of said plurality of individual information areas, with each individual information area being provided with information indicating what type of operating system the control information in the individual information area belongs to.

5. An optical card handling system according to claim 3 or 4, wherein said information indicating what type of operating system the control information belongs to given to each of said individual information areas is flag information.

6. In a computer system for accessing an optical card under the control of a general-purpose operating system, a computer system comprising:

an optical card which data can be optically recorded on and reproduced from; read/write means for reading and writing data from and onto the optical card for data exchange; and driver means which intervenes between said read/write means and said operating system and recombines directory data items; wherein said optical card has files recorded on it in a directory format where directory data items for various types of general-purpose operating system are divided into information usable in common in a plurality of different operating systems and control information peculiar to specific operating systems, and then said information usable in common is set in a common directory area, and said control information is set in individual information areas, thereby forming directory data items in a general-purpose format;

said read/write means has the function of reading said optical card and handing over the file directory information to said driver means, and in a write operation onto said optical card, updating the directory of said optical card with the data in the directory in said general-purpose format obtained from said driver means; and said driver means contains the function of, when accessing the optical card, extracting the control information suited for an operating system to be used and the data in the common directory area from the data in the directory in said general-purpose format, and then recombining these data items into a data format suited for the directory format of said operating system, and the function of, in a write operation onto the optical card, separating information usable in common in a plurality of different operating systems and control information peculiar to specific operating systems from the directory data given by the operating system to be used, recombining these data items into the directory data in said general-purpose format where the information usable in common is set in said common directory area and said control information is set in said individual information areas, and handing over the recombined data to said read/write means.

7. A computer system according to claim 6, wherein the number of said individual information areas provided is plural, and said pieces of control information peculiar to specific operating systems are set in specific individual information areas.

8. A computer system according to claim 6, wherein the number of said individual information areas provided is plural, and said pieces of control information peculiar to specific operating systems are set in arbitrary ones of said individual information areas, with each of said individual information areas being provided with a flag indicating what type of operating system the control information belongs to.

9. A computer system according to claim 6, wherein the number of said individual information areas is any number, and the number of operating systems that can access the optical card is set in said common directory area, said pieces of control information peculiar to specific operating systems are set in arbitrary ones of said individual information areas, and a flag indicating what type of operating system the control information belongs to is set in each of said individual information areas to make the length of data in the directory variable.

10. A computer system according to any one of claims 6 to 9, wherein when at least data for another type of operating system is recorded in said individual information areas at the time of reading from said optical card, the contents of the original data are directly set in the original individual information area in creating the directory in said general-purpose format, and data is set again in the area containing changed data items among said individual information areas in which the control information suited for the type of the used operating system is set and said common directory area.

11. A method of accessing an optical card under the control of a general-purpose operating system, comprising the steps of:

dividing directory data items for various types of general-purpose operating system into information usable in common in a plurality of different operating systems and control information peculiar to specific operating systems in the directory format of files recorded on said optical card, and then setting said information usable in common in a common directory area in an optical card directory, and said control information in individual information areas in said optical card directory, thereby forming directory data items in said general-purpose format;

extracting the control information suited for an operating system to be interfaced with and the data in the common directory area from the data in the directory in said general-purpose format in accessing said optical card under the control of the operating system to read a file from said optical card, recombining these data items into a data format suited for the directory format of said operating system, and handing over the recombined data to said operating system; and separating information usable in common in a plurality of different operating systems and control information peculiar to specific operating systems from the directory data given by said operating system in writing data onto said optical card, recombining these data items into the directory data in said general-purpose format where the information usable in common is set in said common directory area and said control information is set in said individual information areas, and handing over the recombined data.

12. A method of accessing an optical card according to claim 11, wherein the number of said individual information areas provided is plural, and said pieces of control information peculiar to specific operating systems are set in specific individual information areas.

13. A method of accessing an optical card according to claim 11, wherein the number of said individual information areas provided is plural, and said pieces of control information peculiar to specific operating systems are set in arbitrary ones of said individual information areas, with each individual information area being provided with information indicating what type of operating system the control information belongs to.

14. A method of accessing an optical card according to claim 11, wherein the number of said individual information areas is any number, and the number of operating systems that can access the optical card is set in said common directory area, and said pieces of control information peculiar to specific operating systems are set in arbitrary ones of said individual information areas, with each individual information area being provided with information indicating what type of operating system the control information belongs to.

15. A method of accessing an optical card according to claim 13, wherein said information indicating what type of operating system the control information belongs to given to each of said individual information areas is flag information.

16. A method of accessing an optical card according to any one of claims 11 to 14, wherein when at least data for another type of operating system is recorded in said individual information areas at the time of reading from said optical card, the contents of the original data are directly set in the original individual information area in creating the directory in said general-purpose format, and data is set again in the area containing changed data items among said individual information areas in which the control information suited for the type of the used operating system is set and said common directory area.

17. An optical card handling system for accessing an optical card with a directory area to reproduce the information, comprising:

reproduction means with an optical head outputting a light beam to be projected onto said optical card and sensing said light beam via said optical card;

an operating system associated with access to said optical card; and conversion means for converting first directory data read from the directory area of said optical card into second directory data in a format dealt with by said operating system, said conversion means being located between said reproduction means and said operating system; wherein said first directory data is divided into common information usable in common in a plurality of different operating systems and peculiar information exclusively usable in specific operating systems, and said second directory data contains at least the information corresponding to said common information.

18. An optical card handling system for accessing an optical card with a directory area to record the information, comprising:

recording means with an optical head outputting a light beam to be projected onto said optical card;

an operating system associated with access to said optical card; and conversion means for converting second directory data in a format dealt with by said operating system into first directory data read from the directory area of said optical card, said conversion means being located between said recording means and said operating systems; wherein said first directory data converted is divided into common information usable in common in a plurality of different operating systems and peculiar information exclusively usable in specific operating systems.

19. In a method of accessing an optical card with a directory area to record and/or reproduce the information, said directory area containing a common directory area in which directory data usable in common in a plurality of different operating systems is recorded, a first directory area in which directory data usable in a first operating system, and a second directory area in which directory data usable in a second operating system, said method comprising the steps of:

when information is recorded under the control of the first operating system, and the information is reproduced from an optical card where directory data is recorded in said common directory area and said first directory area, (a) reproducing said directory area;

(b) sensing whether said optical card is connected to said first or second operating system;

(c) converting the data into directory data in a format corresponding to the connected operating system on the basis of the directory data from said common directory area and said first directory area; and (d) sending the converted directory data to said operating system; and when information is recorded on said optical card, (e) outputting directory data in a format corresponding to the connected operating system;

(f) converting the outputted directory data into data in a format where common information usable in common in a plurality of different operating systems, first peculiar information exclusively usable in said first or second operating system, and second peculiar information exclusively usable in said second operating system are separated; and (g) recording the converted directory data onto said optical card.

20. The method of accessing an optical cart according to claim 14, said information indicating a type of operating system given to each of said individual information areas which is flag information.

* * * * *